United States Patent
Chicles et al.

(10) Patent No.: US 7,631,275 B2
(45) Date of Patent: Dec. 8, 2009

(54) USER INTERFACE SCREEN SPOTLIGHT EFFECT

(75) Inventors: Christian Thomas Chicles, Winter Park, FL (US); Sankaranarayanan Balasubramanian, Tamilnadu (IN); Kalyani Natarajan, Lawrenceville, GA (US); Raja Thanga Rathinam M, Chennai (IN)

(73) Assignee: Scientific-Atlanta, Inc., Lawrenceville, GA (US)

( * ) Notice: Subject to any disclaimer, the term of this patent is extended or adjusted under 35 U.S.C. 154(b) by 452 days.

(21) Appl. No.: 11/028,838

(22) Filed: Jan. 4, 2005

(65) Prior Publication Data

US 2006/0150103 A1    Jul. 6, 2006

(51) Int. Cl.
 G06F 3/048 (2006.01)
 G06F 3/00 (2006.01)
(52) U.S. Cl. .............. 715/821; 715/768; 715/810; 715/823; 725/39; 725/52
(58) Field of Classification Search ......... 715/821–824, 715/768, 817, 814, 848, 810, 839; 725/39, 725/45, 52
See application file for complete search history.

(56) References Cited

U.S. PATENT DOCUMENTS

| | | | | |
|---|---|---|---|---|
| 5,555,354 A | * | 9/1996 | Strasnick et al. | 345/427 |
| 6,252,596 B1 | | 6/2001 | Garland | |
| 6,335,740 B1 | * | 1/2002 | Tanaka | 715/764 |
| 6,480,210 B1 | * | 11/2002 | Martino et al. | 715/848 |
| 6,664,984 B2 | | 12/2003 | Schlarb | |
| 6,757,906 B1 | * | 6/2004 | Look et al. | 725/45 |
| 6,774,907 B1 | * | 8/2004 | Gupta | 345/589 |
| 2002/0109678 A1 | * | 8/2002 | Marmolin et al. | 345/180 |
| 2002/0147976 A1 | * | 10/2002 | Yuen et al. | 725/40 |
| 2006/0101347 A1 | | 5/2006 | Runov | |

* cited by examiner

*Primary Examiner*—William L Bashore
*Assistant Examiner*—Andrew Tank
(74) *Attorney, Agent, or Firm*—Lewinski Law Group LLC (57) ABSTRACT

An electronic program guide (EPG) having a spotlight effect to focus a user's attention upon a selectable item. The EPG includes a user interface screen for providing a plurality of television programs by time and channel in a grid format. Each television program becomes selectable from the EPG based upon user interaction. The spotlight effect is depicted in association with each television program when it becomes selectable as a result of user interaction. The spotlight effect is defined by non-uniform color which at least partially surrounds and extends from the selectable television program.

22 Claims, 8 Drawing Sheets

USER INTERFACE SCREEN SPOTLIGHT EFFECT

TECHNICAL FIELD

The present invention relates to rendering of user interface screens and, more particularly, relates to providing an electronic program guide for use in a subscription television system where a user is permitted to select programs from the electronic program guide.

BACKGROUND OF THE INVENTION

Subscription television systems typically include an electronic program guide (EPG). With the development of interactive digital set-top boxes (STBs), a new type of advanced multimedia EPGs were developed which may be referred to sometimes as interactive program guides (IPGs). Today, the acronyms EPG and IPG may be used interchangeably.

Figure 1:
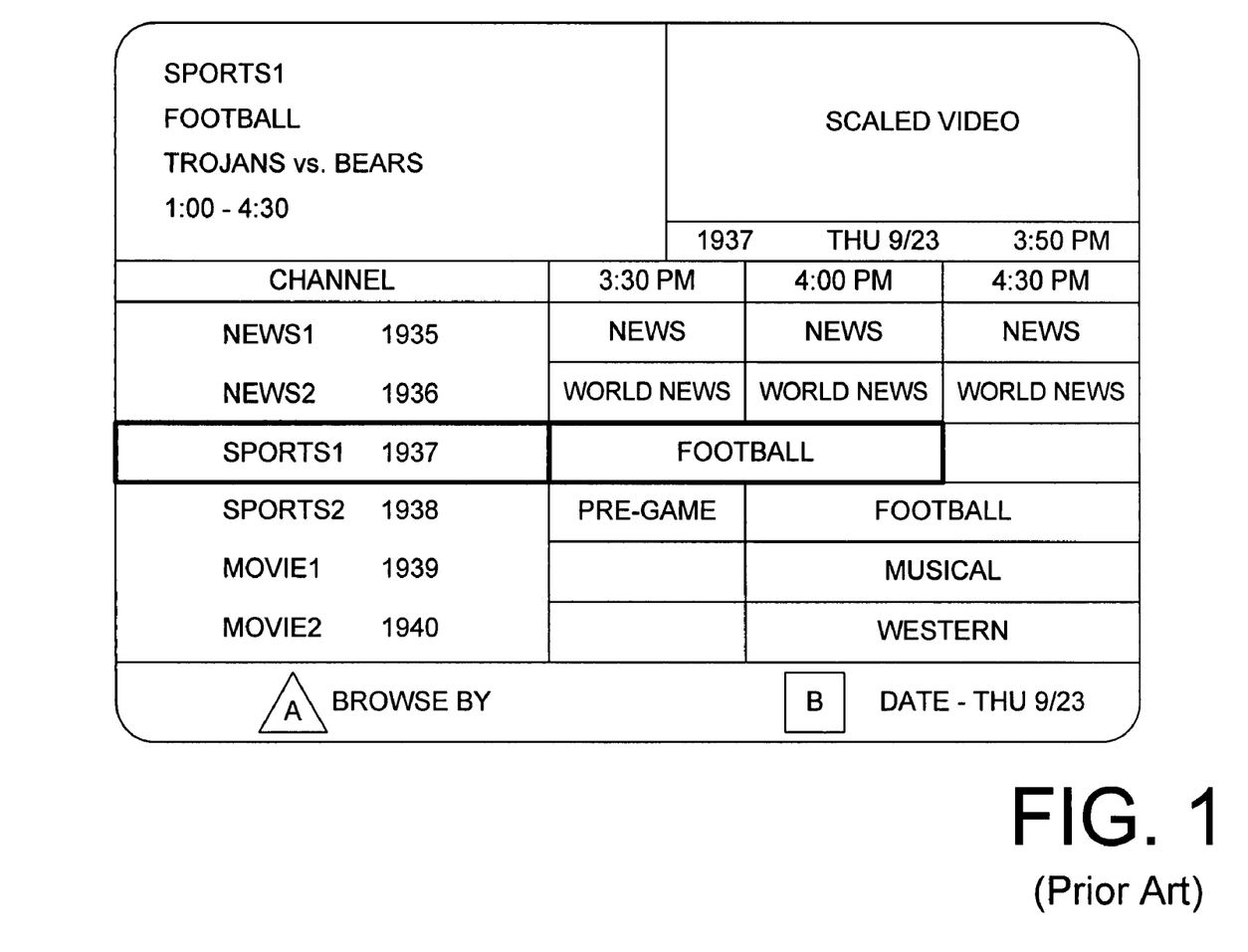
FIG. 1 illustrates a screen-shot of a prior art graphical user interface screen depicting a selectable item.

The EPG provides an onscreen display of a program grid menu that includes a program lineup and episode information for every channel for the next several days. The program grid menu may be arranged in various ways. The program grid menu itself is a user interface where the user may navigate the program grid menu using arrow keys on a remote. For example, FIG. 1 illustrates a typical EPG having a program grid menu based on available channel and time. The user can navigate or scroll through the list of programs within the selected time slot until the desired program is highlighted. Typically, a field in the EPG is shown as being highlighted by using a different color background relative the backgrounds of any other field. Alternatively, a selectable field may be depicted as being enlarged or oversized. In such case, the selectable field may be referred to as a pill.

Once the desired field is highlighted as a selectable item, the user may select the highlighted field using the select button on the remote. In FIG. 1, the user has highlighted the field corresponding with the program titled "Football" which, in turn, corresponds with SPORTS1 channel 1937. The surrounding boundary or edge of the field corresponding with "Football" has been bolded to depict being highlighted. The boundaries of other fields associated with the highlighted field may also be bolded such as the corresponding channel and time.

Figure 2:
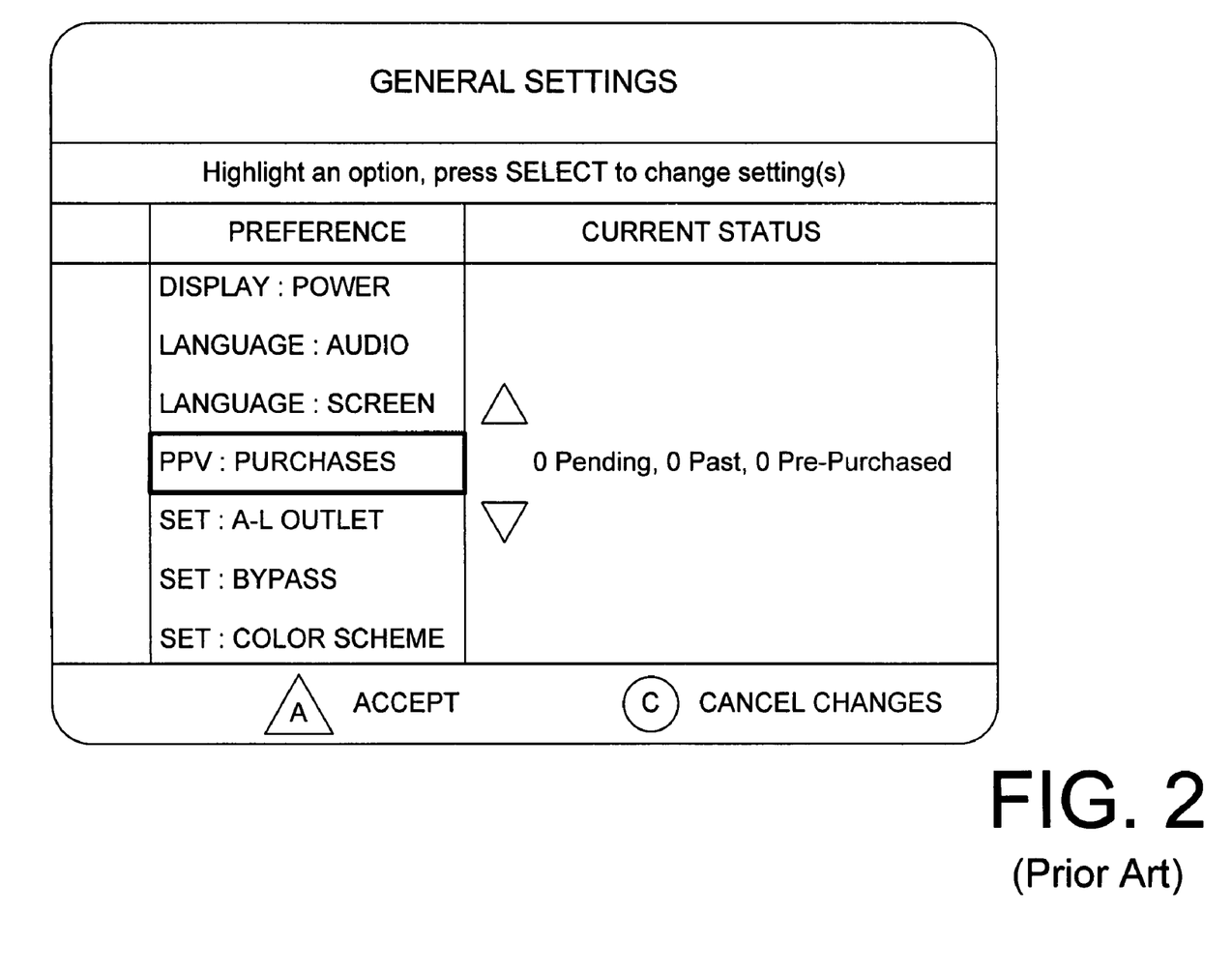
FIG. 2 illustrates a screen-shot of another prior art graphical user interface screen depicting a selectable item.

FIG. 2 also illustrates a menu of options in which the user may interface. The user may scroll through a list of preferences until the desired field is highlighted. The highlighted field becomes selectable and therefore may be referred to as active. The user may then select that option to change its current status. Bolding is used again in FIG. 2 to depict the Pay-Per-View (PPV) Purchases option being highlighted. Although FIGS. 1 and 2 illustrate two particular examples where a field is highlighted within the EPG, today's EPGs include hundreds or even thousands of possibilities which the user may scroll through, highlight and select.

However, because of the increasing number of options within an EPG, as well as because of the difficulty some users have determining which item is selectable, there is a need to bring greater attention to an active list which a user may scroll through and/or a need to bring greater attention to the selectable item in the list.

DETAILED DESCRIPTION

The present invention will be described more fully hereinafter with reference to the accompanying drawings in which like numerals represent like elements throughout the several figures, and in which an exemplary embodiment of the invention is shown. This invention may, however, be embodied in many different forms and should not be construed as being limited to the embodiments set forth herein; rather, the embodiments are provided so that this disclosure will be thorough and complete, and will fully convey the scope of the invention to those skilled in the art. The present invention is described more fully hereinbelow.

Figure 3:
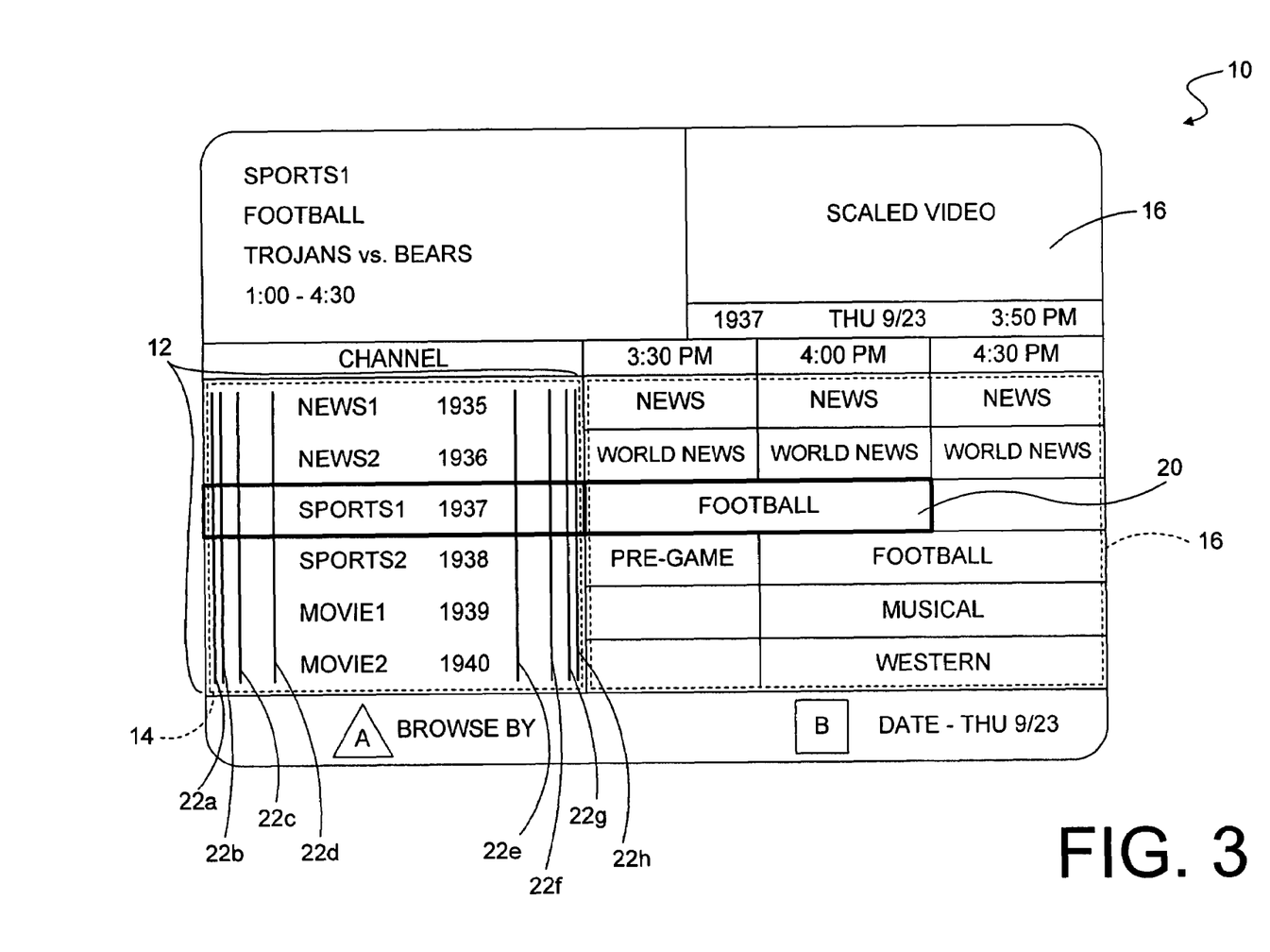
FIG. 3 illustrates a screen-shot of a graphical user interface screen having a spotlight effect according to one embodiment of the present invention.

FIG. 3 illustrates a screen-shot of a graphical user interface screen 10 having a spotlight effect 12 according to one embodiment of the present invention. The spotlight effect 12 is preferably utilized as part of interactive television such as with an EPG/IPG as shown in FIG. 3. However, the spotlight effect 12 may be utilized elsewhere as part of any graphical user interface that may be implemented as part of, for example, video games, interactive course ware, PDA's, cell phones, etc.

The user interface screen 10 of FIG. 3 includes a grid menu of television programs identified by time and channel. As explained above, the television programs may be arranged in any other manner. Preferable, the user interface screen 10 is created by utilizing images which may be tiled or stretched as background for drawn text. These background images may be tiled in either horizontal or vertical directions. Those skilled in the art appreciate that any tilable image carries with it information so that the image can morph itself when the image is displayed. For example, in FIG. 3, the user interface screen 10 includes a background image 14 which corresponds with the list of channels and another background image 16 which corresponds with the program grid of television programs. Images 14 and 16 are depicted by broken lines. Other background images may be utilized elsewhere in the user interface screen 10.

The television program titled "Football" which corresponds with SPORTS1 channel 1937 is identified by reference number 20. As in prior art FIG. 1, the edge of the field having the text for identifying the football television program 20 and the edge of the field having the text of the corresponding channel is bolded to depict being highlighted as a result of user interaction such as scrolling through the program grid.

However, FIG. 3 is distinguishable from FIG. 1 because of the spotlight effect 12 depicted in FIG. 3.

In the embodiment of FIG. 3, the spotlight effect 12 is depicted by vertically-oriented shading lines 22a-h which surround the drawn text in the field of the active channel which corresponds with the football television program 20 currently identified as being selectable by the user. However, the spotlight effect 12 in another embodiment may instead be depicted directly over the selectable field such as football TV program 20. In order to depict one embodiment of the spotlight effect 12 of the present invention, the vertically-oriented shading lines 22a-h gradually decrease in spacing relative one another outwards toward the edge of the image 14. This variation in spacing between the vertically-oriented shading lines 22a-h symbolizes the use of non-uniform color in order to depict the spotlight effect 12. It is preferable that the color of the image 14 appear brightest at the center of the spotlight effect 12, such as at the selectable field and in its immediate proximity, while then darkening as distance increases from the center of the spotlight effect towards the outer confines of the spotlight effect 12. For example, the non-uniform color usage utilized to depict the spotlight effect 12 in FIG. 3 is brightest at the field with the text for indicating the channel corresponding with the currently selectable field for the football television program 20. Then the color in image 14 darkens upon approaching the leftmost and rightmost edges or periphery of image 14. However, other methods such as variations in shading utilizing lines or stippling may be used in order to depict the spotlight effect 12.

The confines of the spotlight effect 12 are generally depicted by the configuration and orientation of the vertically-oriented shading lines utilized in FIG. 3. The leftmost and rightmost vertically-oriented shading lines 22a, 22h correspond substantially with the leftmost and rightmost edge, respectively, of the image 14. Moreover, the innermost vertically-oriented shading lines 22d, 22e substantially correspond with the leftmost and rightmost edges of the drawn text utilized in each of the fields within the active list of channel options the user is currently scrolling through, which includes the channel corresponding with the currently selectable field 20. The length of each of the vertically-oriented shading lines in FIG. 3 corresponds substantially with the height of the image 14. However, the spotlight effect 12 depicted in FIG. 3 preferably appears uniform in color above and below the active channel which corresponds with the selectable field of the football television program 20. Therefore, this particular configuration of vertically-oriented shading lines may be referred to as a columnar spotlight because the spotlight effect 12 is generally column-shaped due to shading on the left and right edges of the spotlight effect which extends outward from the highlighted field and also upward and downward over other unhighlighted or currently unselectable fields. In some embodiments, however, the spotlight effect may extend outward from the highlighted field and over other unhighlighted or currently unselectable fields whether or not the spotlight effect may be referred to as columnar. Also, the color may instead also appear non-uniform above and below the selectable field or the field having the channel corresponding with the selectable field.

However, the shape of the spotlight effect 12 may be varied. For example, the overall lengths of the vertically-oriented shading lines may vary, relative the underlying image or relative one another, to define the exterior confines of the spotlight effect 12. Also, intermediate portions may be removed from one or more of the innermost shading lines on the left and right of the highlighted field, thereby segmenting the shading lines, in order to define the interior confines of the spotlight effect. For example, the interior confines of a spotlight effect may be circular, oval, elliptical or even rectangular. The present invention is not limited to the particular shapes of any spotlight effect specifically indicated in the present invention.

Figure 4:
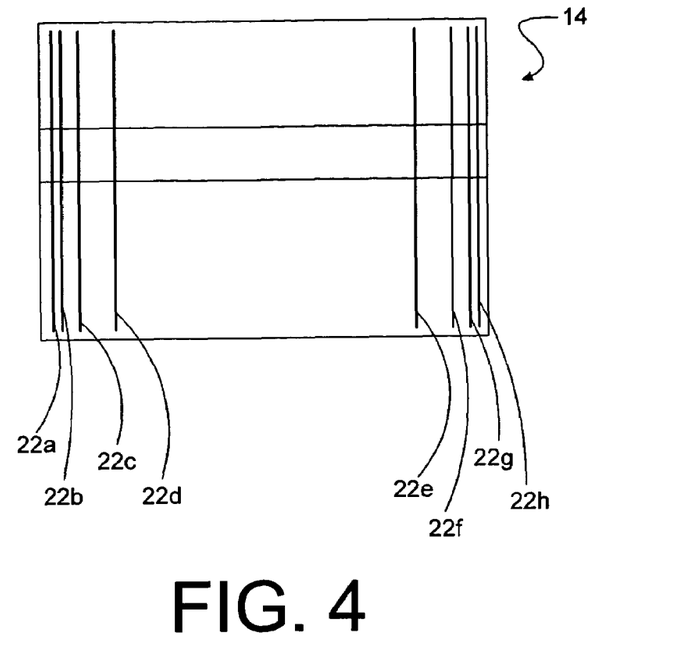
FIG. 4 illustrates one embodiment of a graphical image used to create a portion of the graphical user interface screen of FIG. 3 having the spotlight effect.
Figure 5:
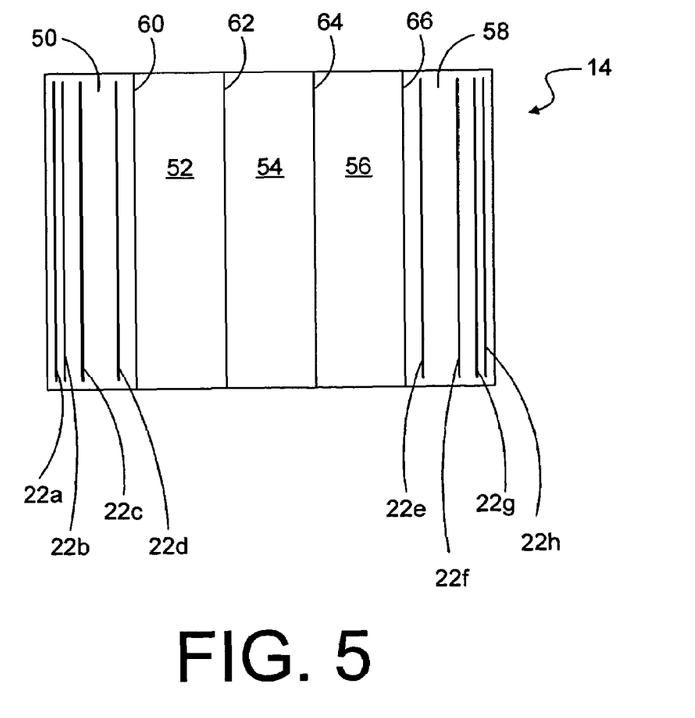
FIG. 5 illustrates one embodiment of a number of tiles used to create the image of FIG. 4.

FIGS. 4 and 5 depict one embodiment of the graphical image 14 used to create a portion of the background for the user interface screen 10 shown in FIG. 3. The drawn text which overlays the image 14 in FIG. 3 is removed. However, the highlighted field that would have the channel number information which corresponds with the football television program 20 is depicted along with the vertically-oriented shading lines 22a-h. In order to render an image such as the image 14, it is preferred that at least a portion of the image is rendered utilizing horizontal and/or vertical tiling.

For example, the image 14 could include tiled portions 50, 52, 54, 56 and 58 as shown in FIG. 5. Boundary lines 60, 62, 64 and 66 have been added in FIG. 5 in between the tiled portions 50, 52, 54, 56 and 58 to highlight one embodiment of the horizontal tiling effect and the placement of non-uniform color. Tiled portion 50 includes shading lines 22a-d and tiled portion 58 includes shading lines 22e-h. Therefore, in one embodiment, the non-uniform color would be utilized in tiled portions 50 and 58 to create the spotlight effect 12. Tiled portions 52, 54 and 56 are copies of one another in order to obtain the desired width of the image 14. For example, tiled portions 52 and 56 are repeats of the center tiled portion 54. Therefore, drawn text or portions thereof of the tiled portions 52, 54 and 56 would be spotlighted by the spotlight effect 12 which is defined by the shading lines 22a-h of tiled portions 50 and 58. Preferably, the drawn text would be drawn over tiled portions 52, 54 and 56. However, tiled portions other than the endmost tiled portions such as tiled portions 50 and 58 may also include non-uniform color, but should then appear to correspond with the use of non-uniform color in adjacent tiled portions in order to define the spotlight effect throughout the desired portion of the image. Alternatively, the spotlight effect 12 could be created by rendering an image such as a transparent image over the highlighted or selectable field so long as the drawn text could be ascertained by the user.

Figure 6A:
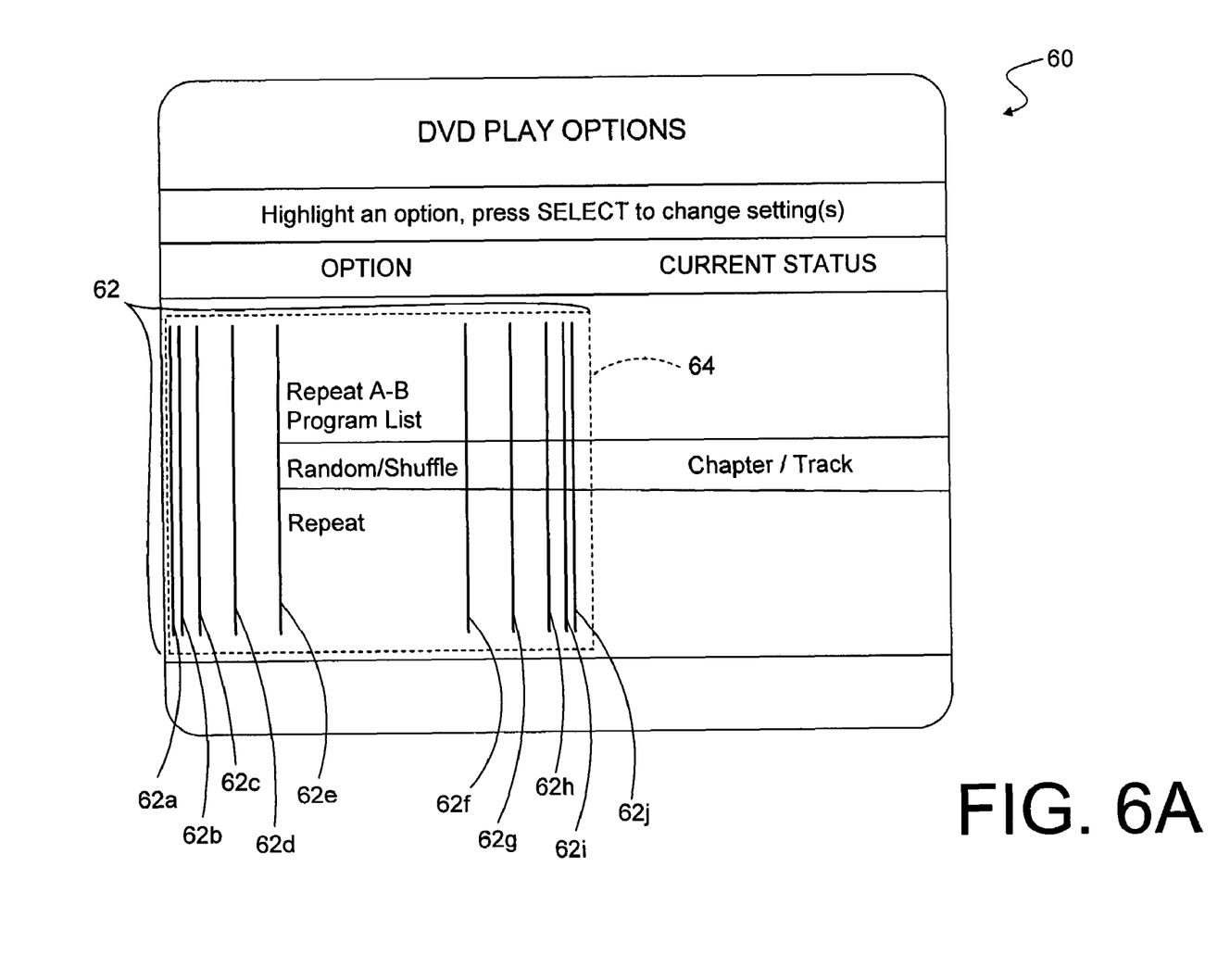
FIG. 6A illustrates a screen-shot of another graphical user interface screen having a spotlight effect according to one embodiment of the present invention.
Figure 6B:
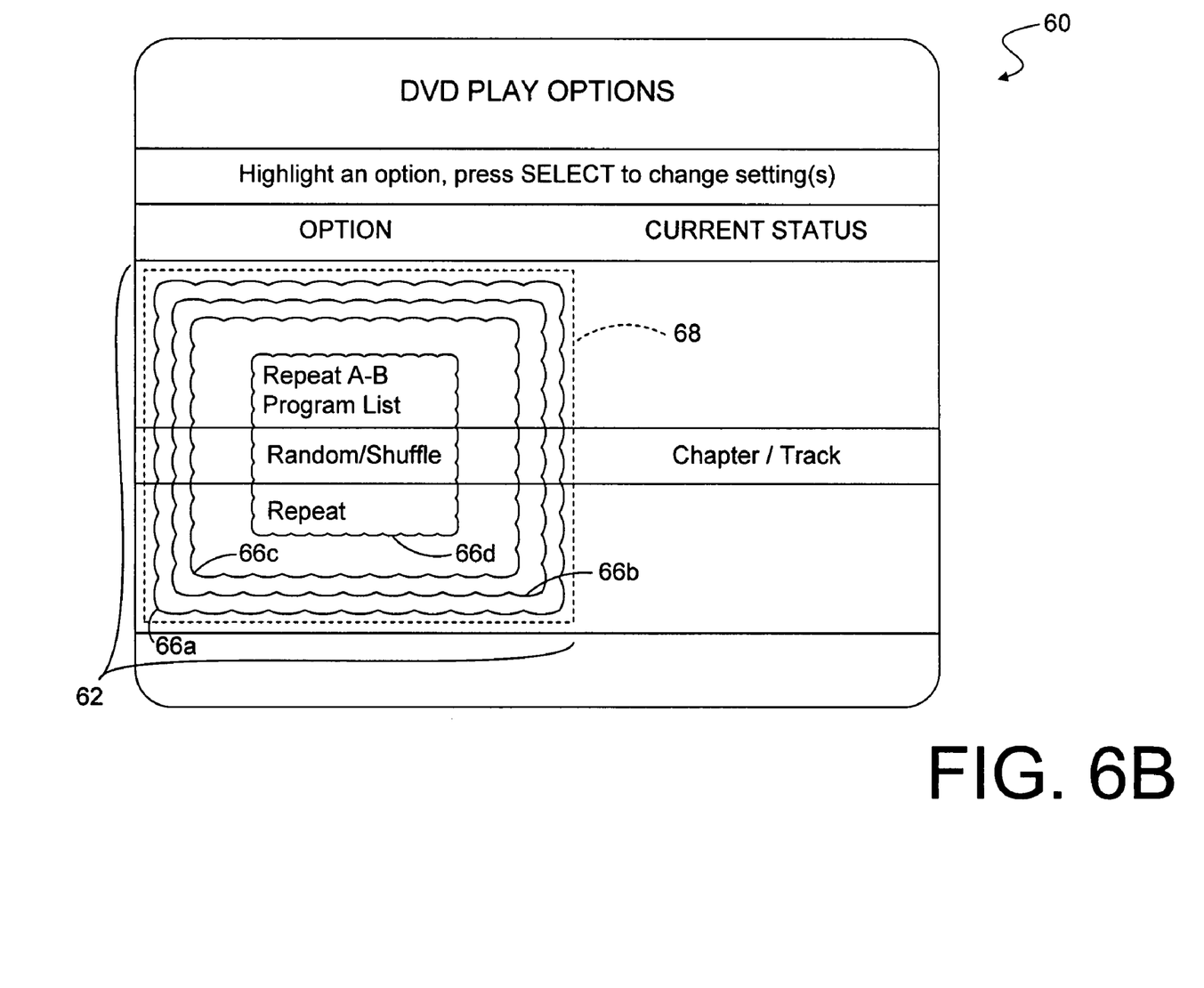
FIG. 6B illustrates a screen-shot of the graphical user interface screen of FIG. 6A having an alternative spotlight effect according to one embodiment of the present invention.

FIGS. 6A and 6B illustrate different embodiments of the spotlight effect of the present invention on the same user interface screen 60. In FIG. 6A, the columnar spotlight effect 62 depicted is similar to columnar spotlight effect 12 depicted in FIG. 3 because of the use of the vertically-oriented shading lines 62a-j to symbolize the use of non-uniform color to the left and right of the selectable field while uniform color continues to be used above and below the selectable field. The closer the vertically-oriented shading lines 62a-j are spaced relative to one another, the darker that portion of the spotlight effect 62 is supposed to be. The spotlight effect 62 substantially corresponds with the confines of image 64 which may be tiled as explained above in regard to image 14 of FIG. 3.

In FIG. 6B, on the other hand, the spotlight effect 66 is substantially rectangular in shape. The spotlight effect 66 is defined by wavy lines 66a-d that surround the selectable field. The wavy lines 66a-d are spaced closer relative one another as distance increases from the center of the spotlight effect 66 focused on the selectable field. The closer the wavy lines 66a-d are spaced relative to one another, the darker that portion of the spotlight effect 66 is supposed to be. However, because the spotlight effect 66 is substantially rectangular, the spotlight effect 66 includes the use of non-uniform color above and below the selectable field. The spotlight effect 66 substantially corresponds with the outer confines or periphery of image 68 which may be tiled as explained above in regard to image 14 of FIG. 3.

Figure 7:
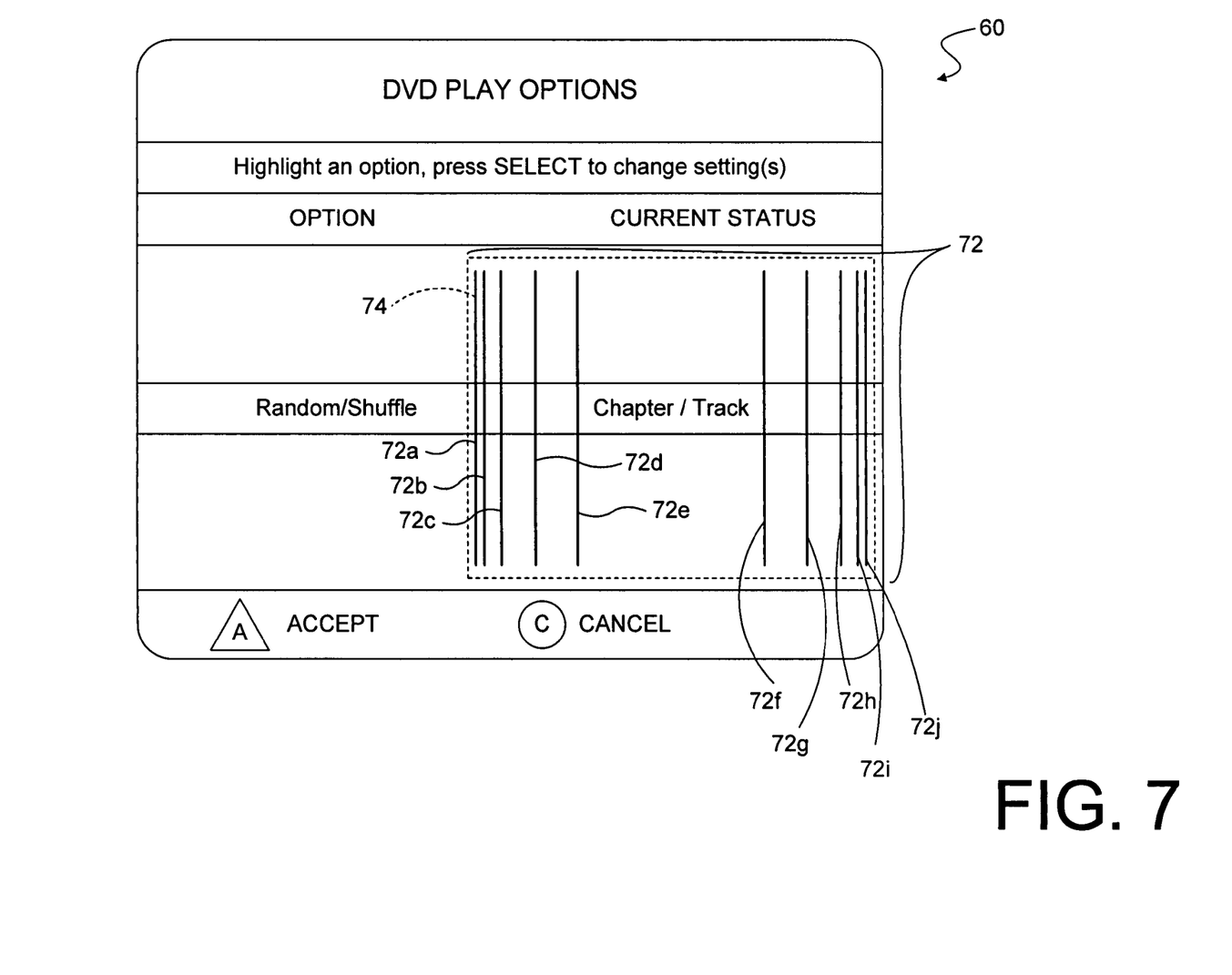
FIG. 7 illustrates a screen-shot of the graphical user interface screen of FIG. 6A with the spotlight effect reoriented due to user interaction according to one embodiment of the present invention.

In FIG. 7, the user has selected the Random/Shuffle option on user interface screen 60 which provided the chapter/track as the current selectable field. The spotlight effect 72 is directed on the user interface to focus the user's attention onto the current selectable field. The spotlight effect 72 is depicted in FIG. 7 by vertically-oriented shading lines 72*a-j* which correspond substantially with the left and right edges of image 74 which may be tiled. The closer the vertically-oriented shading lines 72*a-j* are spaced relative to one another, the darker that portion of the spotlight effect 72 is supposed to be. In spotlight effect 72 as depicted in FIG. 7, non-uniform color is not utilized above and below the selectable field.

Figure 8:
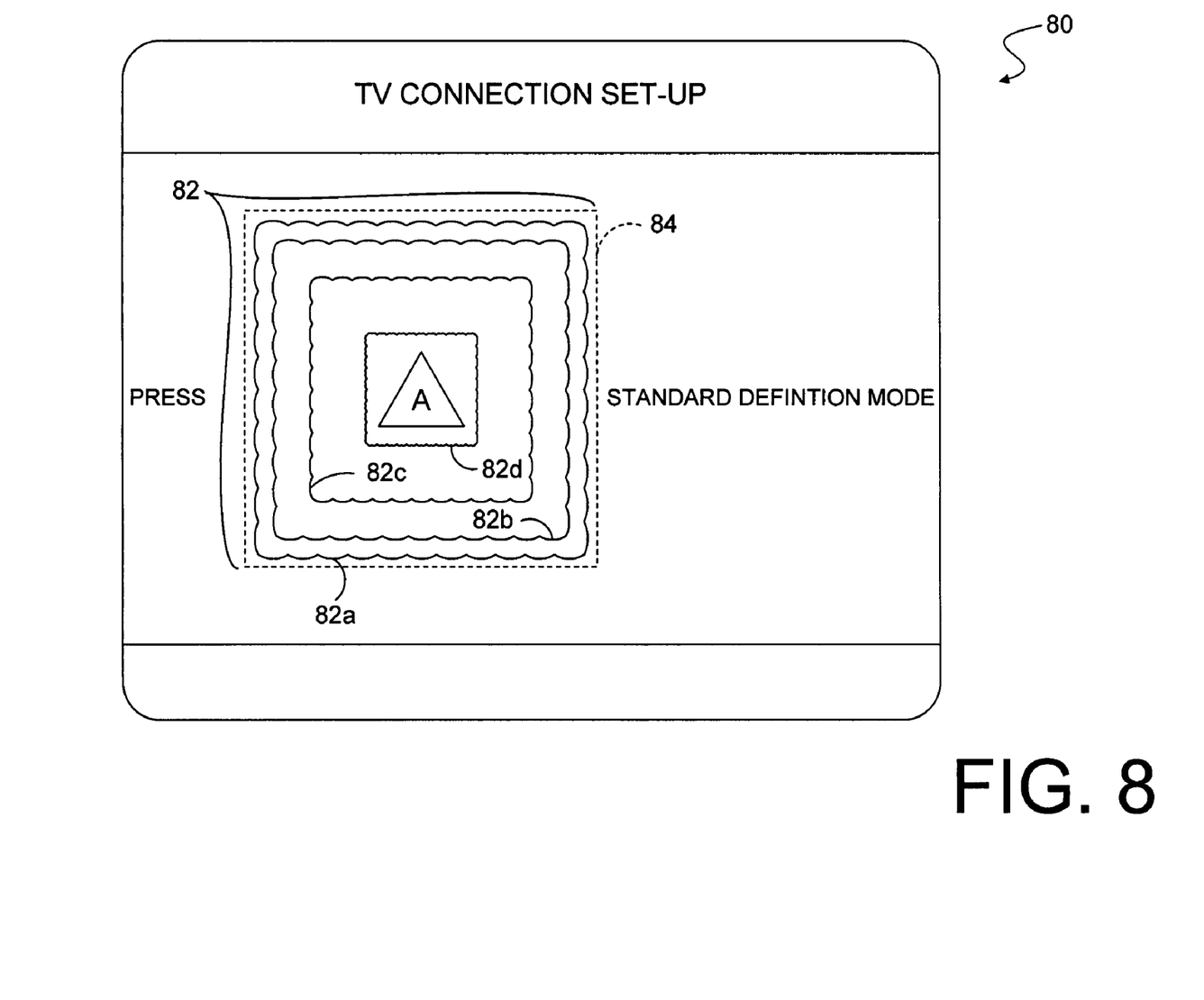
FIG. 8 illustrates a screen-shot of yet another graphical user interface screen having a spotlight effect according to one embodiment of the present invention.

In FIG. 8, a spotlight effect 82 is substantially rectangular in shape. The spotlight effect 82 is defined by wavy lines 82*a-d* that surround the selectable field. The wavy lines 82*a-d* are spaced closer relative one another as distance increases from the center of the spotlight effect 82 focused on the selectable field. The closer the wavy lines 82*a-d* are spaced relative to one another, the darker that portion of the spotlight effect 82 is supposed to be. However, because the spotlight effect 82 is substantially rectangular, the spotlight effect 82 includes the use of non-uniform color above and below the selectable field. The spotlight effect 82 substantially corresponds with the outer confines or periphery of image 84 which may be tiled.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A system for providing an electronic program guide (EPG) comprising:
    a means for providing an EPG;
    a means for displaying said EPG; and
    wherein said EPG includes:
        a user interface screen comprising:
        a first image and a second image, said first and second images non-overlapping and configured to provide a background in association with drawn text,
        a first portion of said drawn text associated with said first image to define first field, a second portion of said drawn text associated with said first image to define a second field, said first and second fields non-overlapping, said first and second fields not associated with said second image, and in addition, one or more portions of said drawn text associated with said second image to define fields associated with said second image,
        a spotlight effect depicted in association with said first image when said first field is selectable by user interaction, said spotlight effect defined by non-uniform color, said non-uniform color becoming darker upon approaching an edge of said first image, said spotlight effect depicted in all fields associated with said first image, said spotlight effect having inner confines corresponding with leftmost and rightmost edges of said drawn text associated with said first image, and having outer confines corresponding with outer confines of said first image,
        wherein said spotlight effect is configured to remain stationary while said user scrolls among said fields associated with said first image.

2. The system of claim 1 wherein said first image defining a portion of said background behind said selectable field is tiled to depict said spotlight effect.

3. The system of claim 2 wherein said first image defining a portion of said background behind said selectable field is tiled horizontally to center said selectable field and wherein the two endmost said tiles are depicted darker than the remaining said tiles in order to depict said spotlight effect.

4. The system of claim 1 wherein said spotlight effect is depicted as extending from said selectable first field outward over other said fields associated with said first image which are not selectable.

5. The system of claim 1 wherein said spotlight effect is substantially columnar in shape.

6. The system of claim 1 wherein said spotlight is substantially elliptical in shape.

7. The system of claim 1 wherein said selectable first field is highlighted to depict itself as being selectable.

8. The system of claim 1, wherein said fields not associated with said first image in which said spotlight effect is depicted are not selectable by said user.

9. The system of claim 1, wherein said fields associated with said first image comprise channel listing fields.

10. A method for focusing a user's attention within an electronic program guide (EPG), said method comprising the following steps:
    said user navigating through a user interface screen, said user interface screen comprising a first image and a second image, said first and second images non-overlapping and configured to provide a background for drawn text, a first portion of said drawn text associated with said first image to form a first field, a second portion of said drawn text associated with said first image to form a second fields, said first and second fields non-overlapping, said first and second said fields not associated with said second image, and in addition, one or more portions of said drawn text associated with said second image to define fields associated with said second image;
    identifying one of said fields associated with said first image as being selectable based upon said user's interaction with said EPG;
    in response to one of said fields associated with said first image being selectable, rendering a spotlight effect in association with said first image;
    utilizing non-uniform color in said first image of said user interface screen in association with said selectable field in order to render said spotlight effect, said spotlight effect characterized by non-uniform color, said non-uniform color becoming darker upon approaching an edge of said first image, said spotlight effect having inner confines corresponding with leftmost and rightmost edges of said drawn text associated with said first image, and outer confines corresponding with outer confines of said first image; and
    said spotlight effect remaining stationary while said fields associated with said first image are scrolled by said user.

11. The method of claim 10 wherein said step of rendering said spotlight comprises rendering a transparent image over said selectable field.

12. A system for providing an electronic program guide (EPG), comprising:

a means for providing said electronic program guide;
a means for displaying said electronic program guide; and
wherein said electronic program guide includes a user interface screen comprising:
a first image and a second image, said first and second images non-overlapping and each configured to provide a background in association with drawn text,
a first portion of said drawn text associated with said first image to form a first field associated with said first image, a second portion of said drawn text associated with said first image to form second field associated with said first image, said first and second fields non-overlapping, and in addition, one or more portions of said drawn text associated with said second image to define one or more fields associated with said second image, wherein each of said fields is associated with no more than one said image,
a spotlight effect associated with said first image when one of said fields associated with said second image is currently selectable by user interaction, said spotlight effect defined by non-uniform color, said non-uniform color becoming darker upon approaching an edge of said first image, said spotlight effect having inner confines corresponding with leftmost and rightmost edges of said drawn text associated with said first image, and outer confines corresponding with outer confines of said first image,
wherein said spotlight effect remains stationary while said user scrolls among said fields associated with said first image.

13. The system of claim 12 wherein at least one said field associated with said first image comprises channel information and wherein at least one said field associated with said second image comprises television program identification information.

14. An apparatus comprising:
a means for providing a graphical user interface screen, said user interface screen comprising:
a first image and a second image, said first and second images non-overlapping, each configured to provide a background in association with drawn text,
a first portion of said drawn text associated with said first image to define a first field, a second portion of said drawn text associated with said first image to form a second field, said first and second fields non-overlapping, said first and second fields not associated with said second image,
a spotlight effect depicted in association with said first image when said first field is selectable by user interaction, said spotlight effect defined by non-uniform color, said non-uniform color becoming darker upon approaching an edge of said first image, said spotlight effect having inner confines corresponding with leftmost and rightmost edges of said drawn text associated with said first image, and outer confines corresponding with outer confines of said first image,
wherein said spotlight effect is configured to remain stationary while said user, scrolls said fields associated with said first image.

15. The apparatus of claim 14 wherein said graphical user interface screen is utilized as pan of an electronic program guide.

16. A system for providing an electronic program guide (EPG), comprising:
a means for providing an EPG; and
a means for displaying said EPG, said EPG including a user interface screen comprising:
a first image and a second image, said first and second images non-overlapping, each configured to provide a background in association with drawn text,
a first portion of said drawn text associated with said first image to define a first field, a second portion of said drawn text associated with said first image to define a second field, said first and second fields not associated with said second image, and in addition one or more portions of said drawn text associated with said second image to form one or more fields associated with said second image and not said first image,
a spotlight effect depicted in association with said first image when said first field is selectable by user interaction, said spotlight effect depicted by non-uniform color said non-uniform color becoming darker upon approaching an edge of said first image, said spotlight effect having inner confines corresponding with leftmost and rightmost edges of said drawn text associated with said first image and having exterior confines corresponding to outer confines of said first image, and
wherein said spotlight effect shape is related to a total number of said fields corresponding to said first image in which said spotlight effect is depicted.

17. The system of claim 16, wherein said one or more fields associated with said second image are not selectable.

18. The system of claim 16, wherein said spotlight effect is reconfigured when a field other than said first field becomes selectable through user interaction.

19. A method for focusing a user's attention in a graphical user interface screen, comprising:
said user navigating through said user interface screen, said user interface screen including a first image and a second image, said first and second images non-overlapping and configured to provide a background in association with drawn text, a first portion of said drawn text associated with said first image to define a first field, a second portion of said drawn text associated with said first image to define a second field associated with said first image, and in addition, one or more portions of said drawn text associated with said second image to define one or more fields associated with said second images, said fields non-overlapping and associated with no more than one said image;
identifying one of said fields associated with said second image as being selectable based upon said user's interaction with said user interface screen;
in response to one of said fields associated with said second image being selectable, rendering a first spotlight effect in said first image;
utilizing non-uniform color to render said spotlight effect, said non-uniform color becoming darker upon approaching an edge of said first image, said spotlight effect depicted in all fields associated with said first image, said spotlight effect having inner confines corresponding with leftmost and rightmost edges of said drawn text associated with said first image, and outer confines that correspond with outer confines of said first image; and
wherein said spotlight effect is configured to remain stationary while said user scrolls among said fields associated with said first image.

20. The method of claim 19, further comprising employing said graphical user interface screen in an electronic program guide (EPG).

21. The method of claim 19, further comprising:

said user further interacting with said user interface screen; and rendering a second spotlight effect in a new image as a result of said user's further interaction, said new image associated with new portions of drawn text to define new fields associated with said new image, said new fields non-overlapping and associated only with said new image, said new fields scrollable by said user while said second spotlight effect remains stationary.

22. The method of claim 19 wherein said second spotlight effect has a shape related to the total number of said new fields associated with said new image.

* * * * *

UNITED STATES PATENT AND TRADEMARK OFFICE
CERTIFICATE OF CORRECTION

PATENT NO. : 7,631,275 B2
APPLICATION NO. : 11/028838
DATED : December 8, 2009
INVENTOR(S) : Chicles et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 709 days.

Signed and Sealed this

Twenty-first Day of December, 2010

David J. Kappos
*Director of the United States Patent and Trademark Office*